United States Patent [19]

Denovich et al.

[11] Patent Number: 5,667,402
[45] Date of Patent: Sep. 16, 1997

[54] WIRE CARRIER FOR ELECTRICAL CONNECTOR MODULAR

[76] Inventors: Sam Denovich, 5310 A Manayunk Rd., Harrisburg, Pa. 17109; Harry Milton Capper, 153 Kingswood Dr., Harrisburg, Pa. 17112

[21] Appl. No.: 573,175

[22] Filed: Dec. 15, 1995

[51] Int. Cl.⁶ .................................................. H01R 4/26
[52] U.S. Cl. ........................................................ 439/409
[58] Field of Search ............................ 439/409, 404, 439/400, 395, 405, 410

[56] References Cited

U.S. PATENT DOCUMENTS

| | | | |
|---|---|---|---|
| 4,283,105 | 8/1981 | Ferrill et al. | 339/97 R |
| 4,426,125 | 1/1984 | Crawford | 339/99 R |
| 4,701,138 | 10/1987 | Key | 439/417 |
| 4,729,738 | 3/1988 | Heng et al. | 439/395 |
| 4,793,823 | 12/1988 | Cozzens et al. | 439/409 |
| 4,975,078 | 12/1990 | Stroede et al. | 439/405 |
| 4,995,829 | 2/1991 | Geib et al. | 439/409 |
| 4,995,830 | 2/1991 | Eckhaus | 439/409 |
| 5,281,163 | 1/1994 | Knox et al. | 439/404 |
| 5,360,352 | 11/1994 | Rudy, Jr. et al. | 439/469 |
| 5,450,469 | 9/1995 | Pamart et al. | 379/27 |

FOREIGN PATENT DOCUMENTS

| | | |
|---|---|---|
| 2626124 A1 | 7/1989 | France . |
| 2129630 | 5/1984 | United Kingdom . |

*Primary Examiner*—Neil Abrams
*Assistant Examiner*—Christopher Goins

[57] ABSTRACT

A wire carrier (100,102) for a NID module (10) for enabling termination of premise wiring tip and ring wires (22,24) to terminals (38,40) of the module for interconnection with circuits of the telephone service provider. Circuits of a circuit element (30) interconnect terminals (38,40) to contacts (36) of a jack (32) exposed for connection to a plug during test and otherwise shunted for in-service use. Each wire carrier preferably terminates both tip and ring wires (22,24) of a cable and is pivotable from a wire-receiving position to a wire-terminating position by a pivot section (104) to urge the wires (22,24) into slots (132) of terminals (38,40).

9 Claims, 5 Drawing Sheets

WIRE CARRIER FOR ELECTRICAL CONNECTOR MODULAR

FIELD OF THE INVENTION

The present invention relates to the field of network interface devices, and more particularly to customer-accessible modules thereof.

BACKGROUND OF THE INVENTION

Network interface devices provide limited access by a subscriber or customer for testing by the subscriber of the subscriber premises wiring, at a telephone junction box where the subscriber premises wiring is connected to circuits of the telephone service provider. Such junction boxes are also fully accessible to service personnel of the telephone company after installation. One such network interface device is disclosed in U.S. Pat. No. 4,979,209 for a plurality of subscribers, wherein an enclosure includes a primary lid extending over the entire enclosure and securable by service personnel, and a secondary lid over the subscriber-accessible portion of the enclosure securable by the subscribers; such enclosures commonly provide access to the subscriber-accessible portion by service personnel but the subscriber-accessible portion remains secured against unauthorized person. Individual modules within the subscriber-accessible portion are disclosed to include individual security covers such that each subscriber module is secured against access by the other subscribers.

The individual subscriber module includes a test port or jack electrically connected to both the premises wiring and the subscriber-dedicated circuits of the telephone service provider, such as wires extending to a distribution cable, enabling the subscriber to remove the port cover and insert the plug of a telephone or other test device to discover the location of a fault disrupting the subscriber's service. Successful connection of the telephone or test device indicates that the fault lies in the premises wiring and thus is the responsibility of the subscriber, whereas an unsuccessful connection of the telephone or test device indicates that the fault lies in the circuits of the telephone service provider. The performance of such testing by the subscriber enables the subscriber to first determine the location of the fault prior to arranging with the telephone company for a service call, thus saving subscriber the expense of a telephone company service call when the fault lies in the premises wiring.

In U.S. Pat. No. 5,420,920 is disclosed a subscriber module having a test port or jack in which pairs of contacts are interconnected by a dedicated plug inserted thereinto to complete circuits between the telephone cable and the premises wiring for regular in-service use. When the dedicated plug is removed during an investigation of a fault, another plug joined to a telephone unit is insertable by the subscriber to again complete the circuits to determine the presence or absence of a fault in the telephone company wiring. The dedicated plug of the module is adapted to seal the jack cavity when in position, protecting the contacts exposed in the jack, and is joined to the module by a lanyard when removed from the jack. Conductors of the premise wiring are easily terminatable by insulation displacement techniques to terminals using a stuffer cap, with the terminals connected to first contacts of the jack contact pairs by circuit board traces, while second contacts of the pairs are connected by other board traces to conductors connected to the distribution cable.

It is desirable to provide the NID module having a jack permitting testing, with integral means enabling the electrical connection of the conductors of the premise wiring through a simplified procedure.

SUMMARY OF THE INVENTION

It is an objective of the present invention to provide an electrical connector module that includes a wire termination arrangement that facilitates termination of the one or more conductor wires to respective terminals of the module, especially for electrical connection of tip and ring wires to a network interface device module.

The module includes a module housing to which are affixed a pair of wire carriers at respective wire termination sections. Each wire carrier is affixed to the module housing at a pivot section enabling pivoting of the wire carrier between wire insertion positions and wire termination positions. Preferably each of the wire carriers includes two passageways, one for each of the tip and ring conductors, so that both the tip and ring wires may be terminated simultaneously. Terminals for the tip and ring wires are mounted on a circuit element of the module contained within the housing, and include wire termination sections extending into slots in a housing-proximate surface of a wire carrier that intersect the passageways. When the wire carrier is in the open position, the wire is insertable past the terminal to a passageway end indicating full insertion; when both wires have been inserted, the wire carrier is pivoted to a closed position forcing the wires into slots of the wire termination sections of the terminals.

Each wire carrier preferably is affixable to the housing by being moved from beside the housing to move the pivot pin under a respective projection having an arcuate bearing section permitting pivoting of the pin therewithin. Also each wire carrier includes a projection proximate the front face disposed within a cavity of the housing, with the cavity permitting movement of the projection until abutting a stop surface to limit movement past the desired open position for wire insertion; the projection is movable into the cavity by passing through a slot in the housing side wall. Upon assembly of the circuit board subassembly to the bottom face of the housing, the wire termination terminals extend upwardly into the slots of the wire carriers sufficiently to prevent the wire carriers from being moved laterally to become inadvertently detached from the housing.

It is an objective of the present invention to provide wire carriers that are movable between open and closed position to terminate the tip and ring wires.

It is an additional objective for the wire carriers to be easily affixable to the module housing in a manner permitting movement between open and closed positions.

It is also an objective that the wire carriers be affixable to the module housing without additional fasteners.

An embodiment of the present invention will now be described by way of example with reference to the accompanying drawings.

DETAILED DESCRIPTION

Figure 2:
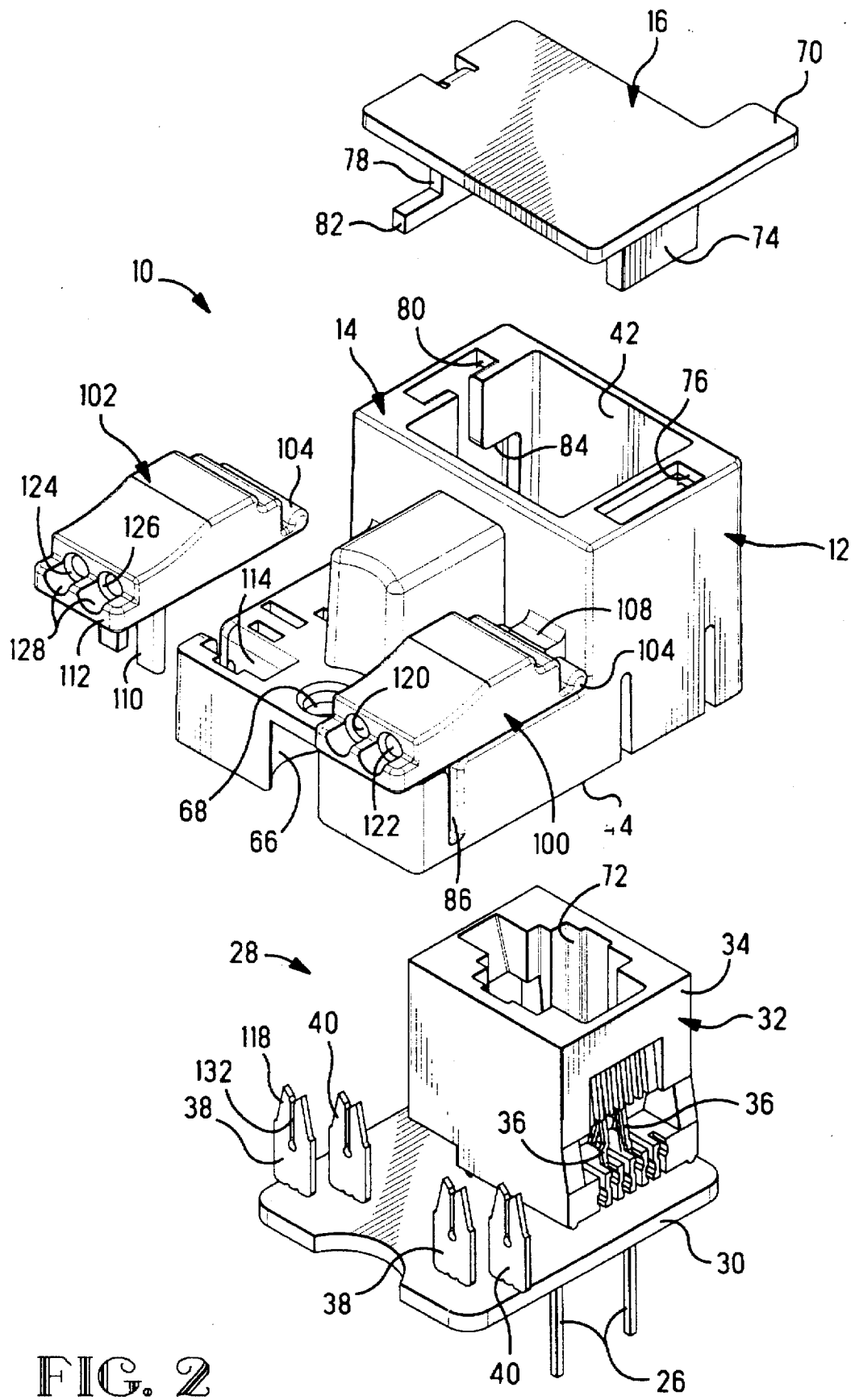
FIG. 2 illustrates the module housing exploded from the circuit board exposing the terminals for subscriber wires and also revealing the test port jack subassembly mounted on the circuit board.

Module 10 is shown to include a module housing 12 having a test port portion 14 with a cover 16, and further having a pair of wire carrier portions 18,20 with one thereof having a pair of subscriber wires (tip and ring) 22,24 in a terminated position. The second wire carrier portion provides for interconnection of a second subscriber line for the same customer. Also seen are a pair of contact posts 26 depending from beneath the test port portion for interconnection of the contacts of the jack to circuits of the telephone service provider (not shown). The test port jack is disclosed in greater detail in U.S. patent application Ser. No. 08/573, 376 filed (concurrently herewith) and assigned to the assignee hereof. In FIG. 2, module housing 12 is seen separated from the remainder of the module to reveal a subassembly 28 comprising circuit board 30 having assembled thereto the test port jack 32 having a jack housing 34 and contacts 36 therewithin secured to circuit board 30. Also affixed to circuit board 30 are contact posts 26 and pairs of terminals 38,40 associated with subscriber cables extending to premise wiring and having pairs of tip and ring wires 22,24. The pairs of terminals 38,40 are staggered relative to each other to achieve a closer spacing therebetween. All of terminals 34,36 and contact posts 26 and contacts 36 are electrically connected to circuits of circuit board 30, and all together are utilized in interconnecting subscriber premise wiring to telephone service provider circuits, or in testing same.

Figure 3:
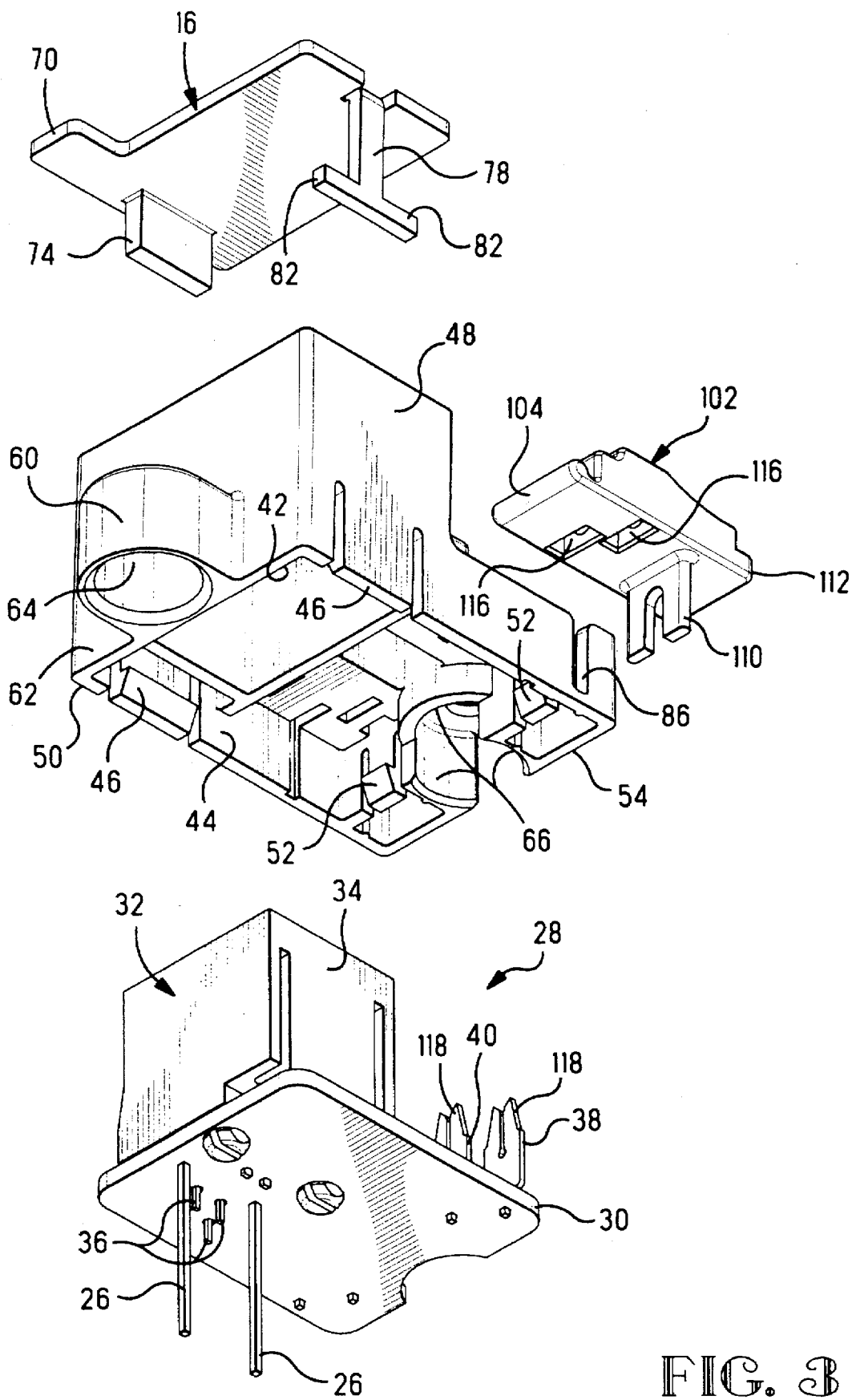
FIG. 3 is an exploded isometric view of FIG. 2 from below thereof also showing the jack cap and one of the wire carrier exploded from the module housing.

Referring to FIG. 3, module housing 12 is seen to include a large through cavity 42 for receipt thereinto of the test port jack 32 from beneath during assembly and a plug (not shown) from above during testing. Module housing 12 also defines a shallow recess into the bottom face 44 of module housing 12 for receipt of the circuit board. A pair of first latch members 46 are disposed along the bottoms of opposed side walls 48,50 of module housing 12 at bottom ends of latch arms defined by portions of side walls 48,50; a pair of second latch members 52 are disposed beside a periphery of the shallow recess near third side wall 54; latch members 46,52 become latched over edge portions of circuit board 30 upon module assembly.

Figure 1:
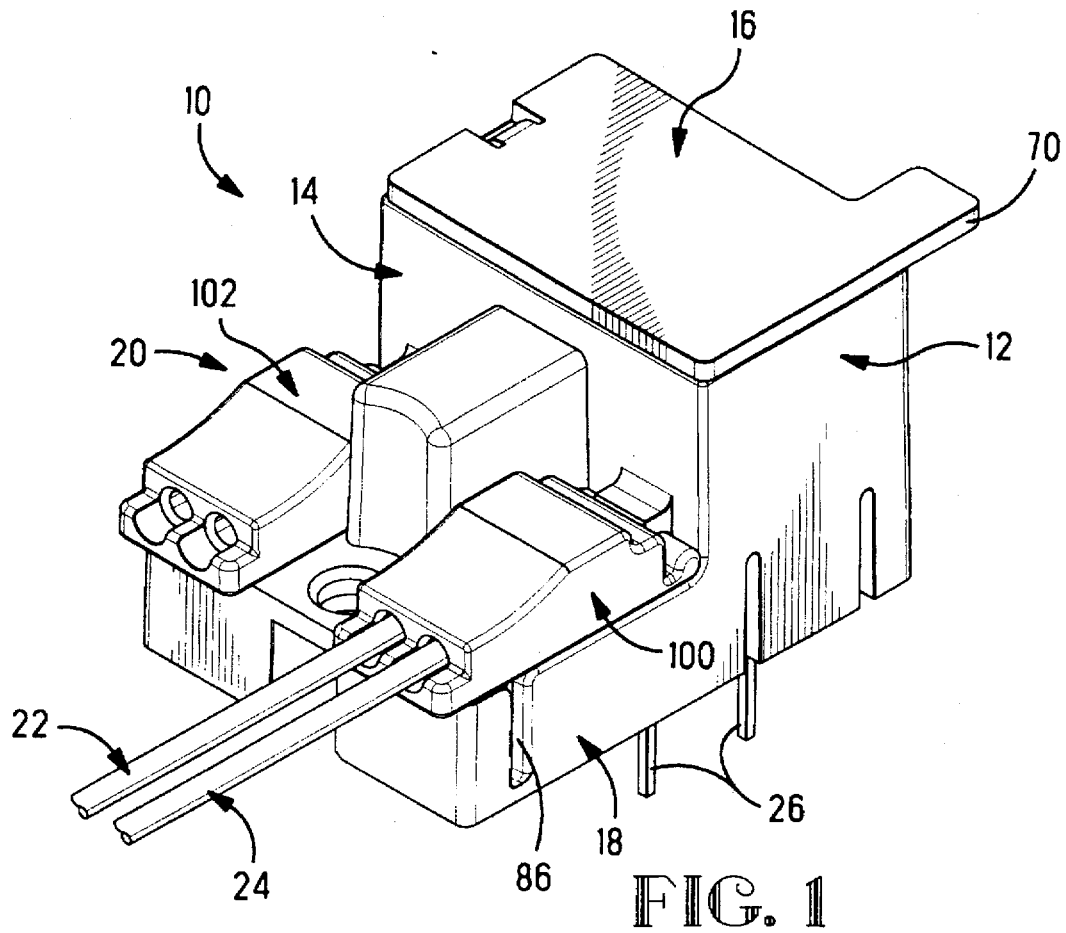
FIG. 1 is an isometric view of the module showing one pair of subscriber wires in a terminated position in a wire carrier, and also a second wire carrier.

Module housing 12 is seen to include a mounting flange 60 extending outwardly from the base of fourth side wall 62 and having an aperture 64 therethrough for receipt of a fastener (not shown) for mounting module 10 to a panel (not shown) of a network interface device enclosure. Also seen in FIG. 3 is a rudimentary annular flange 66 extending to bottom face 44 generally outwardly of latch members 50 and near third side wall 54, defining a clearance for receipt of another fastener (not shown) to extend therewithin from and through aperture 68 (FIGS. 1 and 2) into a top surface portion of module housing 12 between wire carrier portions 18,20 for module mounting in the enclosure. After mounting of module 10 to the enclosure panel, contact posts 26 are electrically connected to telephone service circuits.

Test port cover 16 includes a manually engageable tab 70 extending outwardly from test port portion 14 of module housing 12 when cover 16 is in position traversing large through cavity 42 and the plug-receiving aperture 72 of the jack therewithin. Cover 16 is seen to have a long tab-shaped embossment 74 depending from its lower surface and receivable into slot 76 into the top of test port portion 14 to one side of plug-receiving aperture 72, and also an inverted T-shaped embossment 78 depending therefrom receivable into a second slot 80 to the other side of aperture 72. Ears 82 of T-shaped embossment 74 are latchable under ledges 84 (FIG. 2) within large through cavity 42 for latchably securing cover 16 over test port portion 14 after tab-shaped embossment 74 is fully inserted into slot 76, and are pivotable out of a latched condition when tab 70 is urged upwardly at the opposite end of the cover, for cover removal to expose plug-receiving aperture 72 for testing.

Figure 4:
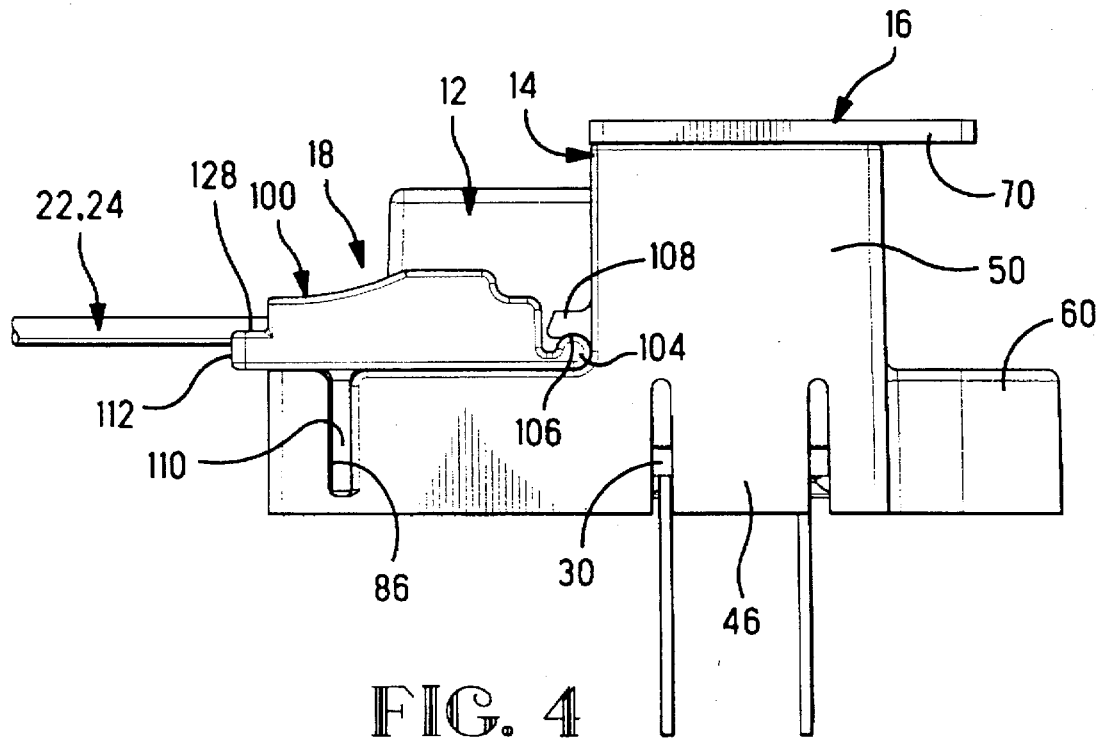
FIG. 4 is a side view of the module of FIG. 1.

Wire carriers 100,102 are affixable to respective termination regions 18,20 of the module at third side wall 54, best seen in FIGS. 3 and 4. At rear faces of the wire carriers are defined semicylindrical pivot pins 104 preferably integral with the wire carriers that will be insertable into and seatable within complementary recesses 106 of module housing 12 defined beneath projections 108. A bifurcate embossment 110 depends from the bottom surface of each wire carrier proximate front face 112, insertable into cavity 114 of module housing 12. Slots 116 are provided into the bottom surface for receipt thereinto of upper portions 118 of terminals 38,40 (FIG. 2). Each wire carrier is assembled to module housing by being moved laterally into position from a respective side wall 48,50, with pivot pin 104 interfitting under a respective projection 108, and with bifurcate embossment 110 passing through vertical slot 86 in the side wall. Once subassembly 28 is affixed beneath module housing 12, upper portions 118 of terminals 38,40 within slots 116 prevent the wire carriers from being moved laterally.

Each wire carrier includes a pair of wire-receiving passageways 120,122 extending thereinto from entrances 124, 126 along front faces 112. Wire guides 128 preferably are provided at the entrances 124,126 and extending outwardly therefrom to assist in capturing leading ends of wires 22,24 especially if they are being inserted into the wire-receiving passageways from above at a steep angle.

Figure 5:
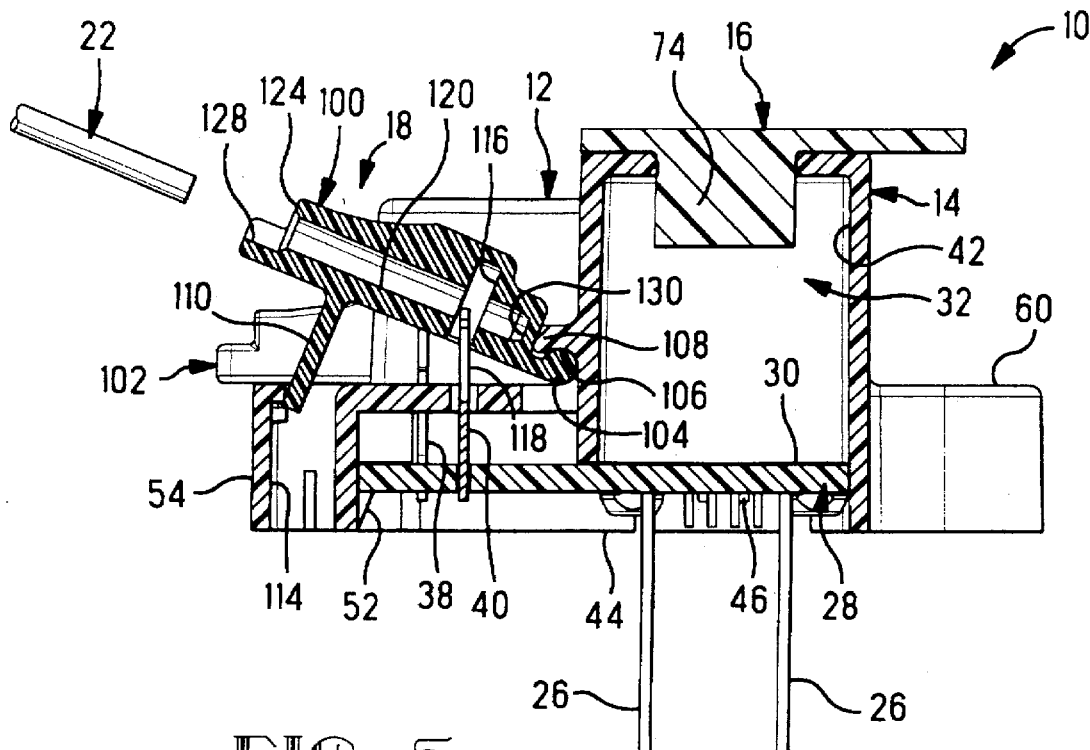
FIGS. 5 to 7 are cross-section views of the module showing the wire carrier to which subscriber wires are being terminated, with FIG. 5 showing the wires being inserted, the wire carrier being pivoted in FIG. 6, and the wires fully terminated in FIG. 7.
Figure 6:
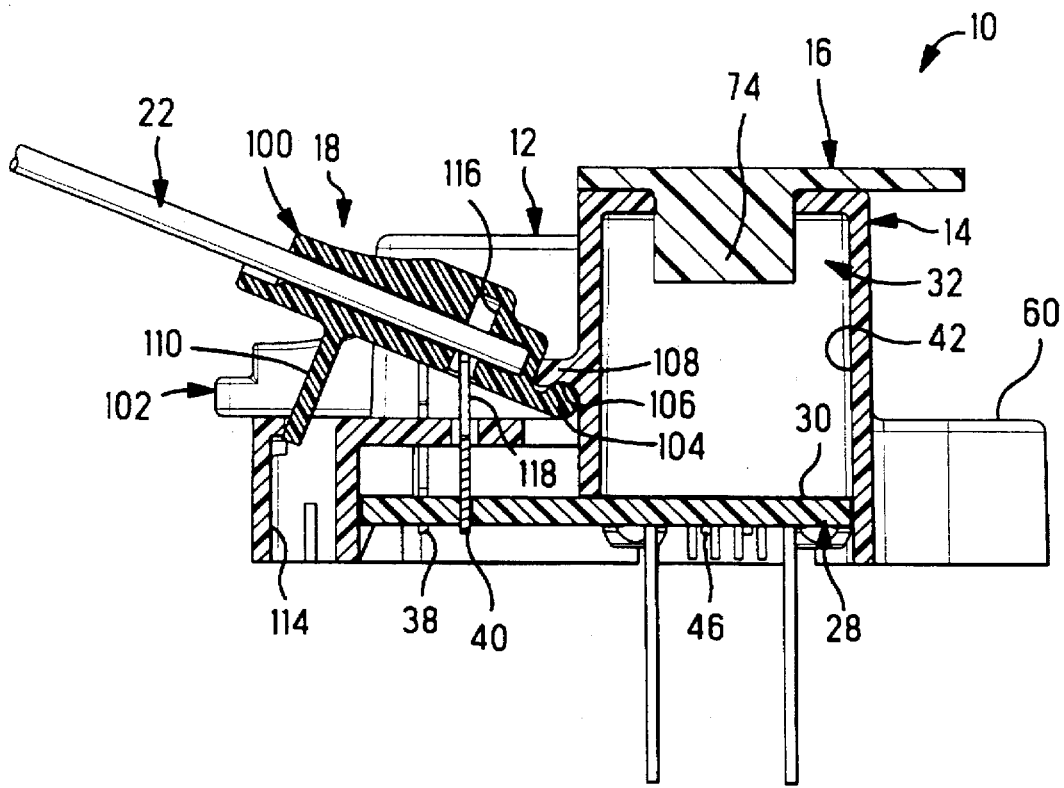
Figure 7:
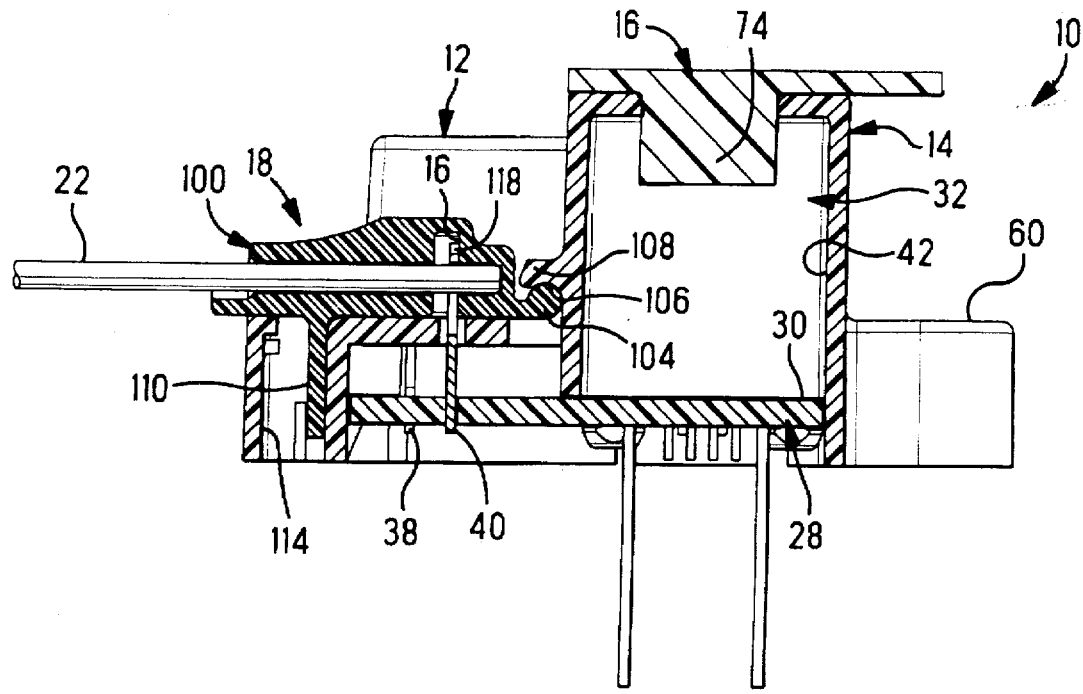

Wire insertion and termination is demonstrated in FIGS. 5 to 7. With wire carrier 100 rotated at pivot pin 104 to an insertion position with front face 112 angled upwardly (FIG. 5), an end of a wire 22 is inserted through entrance 124 and into passageway 120 until abutting the passageway end 130 (PIG. 6), thus passing through slot 116 and being positioned above upper portion 118 of terminal 40 and centered above slot 132 of the terminal (FIG. 2); at the same time, the other wire is similarly inserted into the other passageway of the wire carrier. Front face 112 is then pivoted downwardly to a terminated position, urging wire 22 downwardly into slot 132 of terminal 40 (and wire 24 into the slot of terminal 38) such that the edges defining the slots penetrate the wire insulation and establish press fits with the respective conductors therewithin, in conventional insulation displacement fashion.

Figure 8:
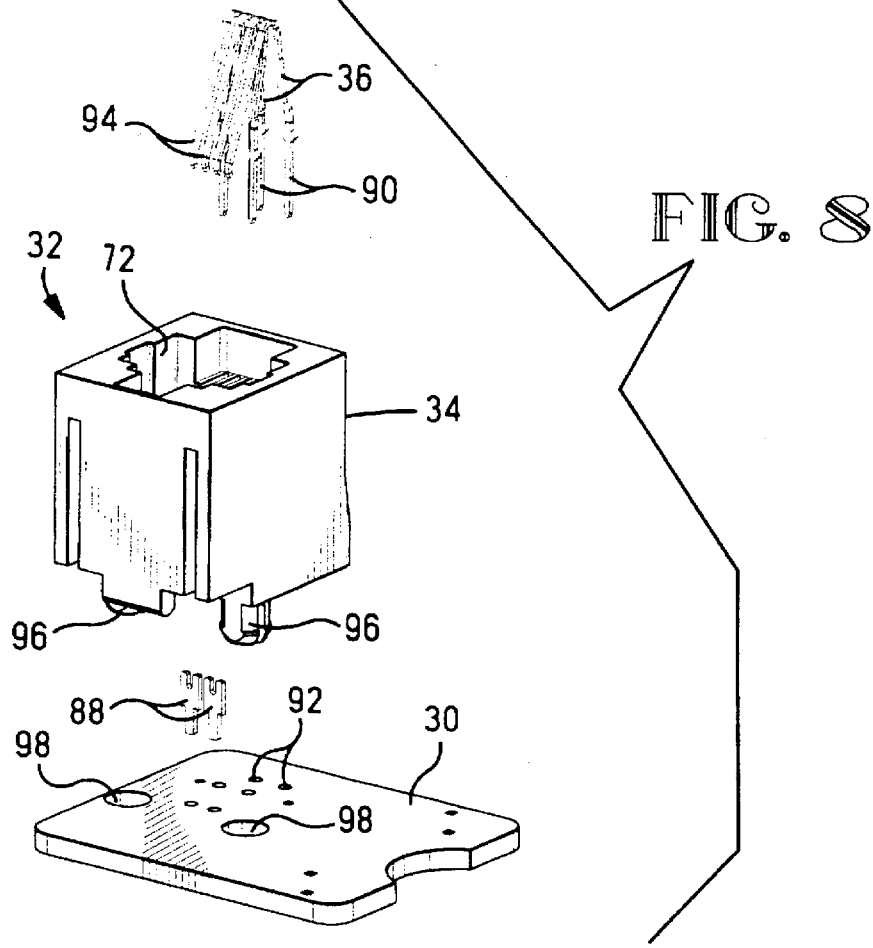
FIG. 8 is an exploded view of the jack of FIG. 2.

FIG. 8 illustrates test port jack 32, having housing 34 and four contacts 36 to be housed therewithin along with two shunt contacts 88. Ends 90 of contacts 36 are soldered in through holes 92 of board 30, with shunt contacts 88 mounted in similar fashion. The four contacts 36 are associated in adjacent pairs, with ones of each pair connected to terminals 38 or to terminals 40 and thus to the tip and ring wires 22,24; and the others to contacts 26 and thus to the telephone service circuits. Contacts 36 include elongate cantilever beam contact arms 94 that when jack 32 is fully assembled will be biased against the shunt contacts in pairs to be interconnected to each other, or shunted, during in-service use to complete the circuits of premise wiring to distribution cable, and will be moved out of shunt engagement to engage contacts of a plug inserted into plug-receiving cavity 72 during test, again completing the premise wiring-to-cable circuits. Jack housing 34 is affixed to board 30 by retention posts 96 that snap-fit into mounting holes 98 of board 30. Jack 32 is described in greater detail in U.S. patent application Ser. No. 08/573,376.

Variations and modifications may occur with respect to the embodiment disclosed herein that are within the spirit of the invention and the scope of the claims.

What is claimed is:

1. A wire termination arrangement for a connector module of the type having terminals secured within a module housing, the arrangement comprising:

at least one wire carrier having at least one wire-receiving passageway thereinto from an exposed front face, a rearward end including a pivot section adapted to cooperate with a complementary pivot section of said module housing to move said wire carrier from a first or wire insertion position to a second or wire termination position, a depending projection proximate said front face disposed within a respective cavity of said module housing, cooperable with said module housing to limit pivoting movement of said wire carrier thus defining said first position, and at least one slot extending into a housing-adjacent face to receive thereinto a wire termination section of a corresponding at least one insulation displacement terminal as said wire carrier is moved from said first position to said second position, said slot intersecting said wire-receiving passageway, whereby with an end of a conductor of the premise wiring inserted along a respective said wire-receiving passageway, said wire carrier is movable from said first position to said second position urging said wire into a wire-termination slot of said insulation displacement terminal thus terminating said conductor.

2. A wire terminating arrangement as set forth in claim 1 wherein each said wire carrier includes a wire guide extending forwardly from an entrance to each said wire-receiving passageway thereof to capture a wire end for facilitating insertion through a said entrance.

3. A wire terminating arrangement as set forth in claim 1 wherein each said wire carrier includes at least one slot extending upwardly through said bottom surface and intersecting a respective said wire-receiving passageway for receipt thereinto of a wire termination section of a said insulation displacement terminal.

4. A wire terminating arrangement as set forth in claim 1 wherein each said wire carrier includes two said passageways for both tip and ring wires of the premise wiring to be terminated to respective said terminals.

5. A wire terminating arrangement as set forth in claim 4 wherein each said wire carrier includes two slots extending upwardly through said bottom surface and intersecting respective said wire-receiving passageways for receipt thereinto of wire termination sections of respective said insulation displacement terminals.

6. A wire terminating arrangement as set forth in claim 5 wherein said two slots are relatively staggered to receive thereinto wire termination sections of correspondingly staggered ones of said insulation displacement terminals.

7. A wire terminating arrangement as set forth in claim 1 wherein each said wire carrier includes an integral pivot pin at said rearward end, pivotable in a concave bearing surface of a respective projection of said module housing.

8. A wire terminating arrangement as set forth in claim 7 wherein each said wire carrier is affixable to said module housing by being moved laterally from a side wall thereof with said pivot pin movable beneath a said projection.

9. A wire terminating arrangement as set forth in claim 1 wherein each said wire carrier includes an integral pivot pin at said rearward end, pivotable in a concave bearing surface of a respective end, pivotable in a concave bearing surface of a respective projection of said module housing, and each said wire carrier is affixable to said module housing by being moved laterally from a side wall thereof with said pivot pin movable beneath a said projection and said depending projection passing through a slot in said side wall communication with said cavity.

* * * * *